(12) United States Patent
Donis et al.

(10) Patent No.: US 9,152,394 B2
(45) Date of Patent: Oct. 6, 2015

(54) GENERATING APPLICATION MODEL BUILD ARTIFACTS

(71) Applicant: International Business Machines Corporation, Armonk, NY (US)

(72) Inventors: Paul S. Donis, Amprior (CA); Glenn D. Rasmussen, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/735,817

(22) Filed: Jan. 7, 2013

(65) Prior Publication Data

US 2014/0075407 A1    Mar. 13, 2014

Related U.S. Application Data

(60) Provisional application No. 61/700,784, filed on Sep. 13, 2012.

(51) Int. Cl.
*G06F 9/44* (2006.01)
*G06F 9/45* (2006.01)

(52) U.S. Cl.
CPC .. *G06F 8/35* (2013.01); *G06F 8/70* (2013.01); *G06F 8/71* (2013.01); *G06F 8/73* (2013.01)

(58) Field of Classification Search
None
See application file for complete search history.

(56) References Cited

U.S. PATENT DOCUMENTS

| | | | |
|---|---|---|---|
| 6,405,364 B1 * | 6/2002 | Bowman-Amuah | 717/101 |
| 7,505,990 B2 | 3/2009 | Krishna et al. | |
| 7,865,820 B2 * | 1/2011 | Sauer et al. | 715/234 |
| 7,877,737 B2 * | 1/2011 | Austin et al. | 717/132 |
| 7,921,137 B2 * | 4/2011 | Lieske et al. | 707/802 |
| 8,209,660 B2 | 6/2012 | Sundararajan et al. | |
| 8,522,195 B2 * | 8/2013 | Miloslavsky et al. | 717/104 |
| 8,527,451 B2 * | 9/2013 | Heidasch | 706/55 |
| 8,566,358 B2 * | 10/2013 | Lane et al. | 707/792 |
| 2009/0013305 A1 | 1/2009 | Clarke | |
| 2009/0319981 A1 | 12/2009 | Akkiraju et al. | |
| 2011/0161922 A1 | 6/2011 | Gerken | |
| 2012/0096426 A1 | 4/2012 | Sarafudinov | |
| 2013/0054563 A1 * | 2/2013 | Heidasch | 707/711 |

OTHER PUBLICATIONS

N. Koch, "Classification of model transformation techniques used in UML-based Web engineering," IET Softw., 2007 (pp. 98-111).
Andreas Kraus, "Model Driven Software Engineering for Web Applications," Dissertation, Apr. 23, 2007 (408 pages).

(Continued)

*Primary Examiner* — Don Wong
*Assistant Examiner* — Devayani R Talukdar
(74) *Attorney, Agent, or Firm* — Shumaker & Sieffert, P.A.

(57) ABSTRACT

An application model build processor generates one or more application model build artifacts based on an application model. In one example, a method includes receiving inputs identifying application model subsets and audiences, and associating application model subsets with the audiences. The method further includes receiving inputs identifying semantic constructs of the application model with the application model subsets. The method further includes generating application model build artifacts based on the application model and defined subsets. The method further includes generating documentation topics for semantic constructs in the application model based on the semantic construct, the subsets to which it belongs, the audiences associated with those subsets, and other semantic constructs in those subsets.

20 Claims, 6 Drawing Sheets

(56) References Cited

OTHER PUBLICATIONS

Alexandre Bellini et al., "Top-Down Approach for Web Services Development," 2010 Fifth International Conference on Internet and Web Applications and Services, IEEE Computer Society (2010) pp. 426-431).

Rama Akkiraju et al., "Toward the Development of Contextually Aware Business Applications via Model-driven Transformations," 2008 IEEE International Conference on Web Services, IEEE (2008) pp. 569-576.

Rama Akkiraju et al., "Toward the Development of Cross-platform Business Applications via Model-driven Transformations," 2009 Congress on Services—I, IEEE (2009) pp. 585-592.

Response to Office Action dated Apr. 23, 2015, from U.S. Appl. No. 14/225,386, filed on Jul. 21, 2015, 10 pp.

Office Action from U.S. Appl. No. 14/225,386, dated Apr. 23, 2015, 28 pp.

* cited by examiner

GENERATING APPLICATION MODEL BUILD ARTIFACTS

CROSS-REFERENCE TO RELATED APPLICATION

This application claims the benefit of U.S. Provisional Application No. 61/700,784, filed Sep. 13, 2012, the entire content of which is hereby incorporated by reference.

TECHNICAL FIELD

The invention relates to enterprise software systems, and more particularly, to application models for enterprise software systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by one user with data submitted by other users. Using the results of these calculations, the system may generate reports for review by higher management. Often these complex systems make use of data stores such as relational databases and multidimensional data structures referred to herein as data cubes.

Reporting and analysis end user products (typically referred to as Business Intelligence, or BI, tools) allow users to author reports and perform data exploration and analysis on a myriad of data sources including, primarily, relational and multi-dimensional databases, as well as flat files, Extensible Markup Language ("XML") data, data streams, and unorganized text and data. Executing an individual report or analysis by BI tools may include parsing and planning the query and then executing the query on the underlying data source, retrieving data from the underlying data source in response to the query, and returning the data to the BI tools. The BI tools may include an Online Analytical Processing (OLAP) interface for querying the multi-dimensional cubes.

BI tools may be accessed through different interfaces, such as a mashup environment or a software development kit (SDK), for example. A mashup environment may enable a relatively simpler and more streamlined interface, while an SDK may enable a larger set of functionality and flexibility, which may be more suitable for client developers to perform tasks such as developing sophisticated automation or developing integration of the BI tools with external or custom software. The SDK may be accompanied by documentation for client developers to gain understanding of the SDK and how to use its features to make full use of the BI tools.

SUMMARY

In general, this disclosure describes techniques for an enterprise software system that enables automated generation of application model build artifacts based on subsets of an application model. These application model build artifacts may be targeted for different groups of audiences or consumers of the application, such as the developers of the application and different clients that use the application, such as clients who use a Software Development Kit (SDK) for the application. The automated generation of application model build artifacts may include automated generation of semantic artifacts and documentation artifacts based on subsets of the application model.

One example is directed to a method for generating one or more application model build artifacts based on an application model. The method includes receiving, by a computing device, one or more inputs identifying one or more application model subsets. The method further includes receiving, by the computing device, one or more inputs identifying one or more audiences. The method further includes receiving, by the computing device, for at least one respective audience from the one or more audiences, at least one input associating a respective application model subset from the one or more application model subsets with the respective audience. The method further includes receiving, by the computing device, one or more inputs identifying each of one or more semantic constructs of the application model with at least one of the application model subsets, including the respective application model subset. The method further includes generating, by the computing device, one or more application model documentation topics for the semantic constructs in the one or more application model subsets for the one or more audiences. The method further includes generating, by the computing device, the one or more application model build artifacts based on the respective application model subsets associated with the semantic constructs identified within the respective application model subsets. The method further includes generating, by the computing device, one or more application model documentation artifacts based on the application model.

In another example, a computing system includes one or more processors and one or more computer-readable tangible data storage devices. The computing system further includes program instructions, stored on at least one of the one or more computer-readable tangible data storage devices, to receive one or more inputs identifying one or more application model subsets devices. The computing system further includes program instructions, stored on at least one of the one or more computer-readable tangible data storage devices, to receive one or more inputs identifying one or more audiences. The computing system further includes program instructions, stored on at least one of the one or more computer-readable tangible data storage devices, to receive, for at least one respective audience from the one or more audiences, at least one input associating a respective application model subset from the one or more application model subsets with the respective audience. The computing system further includes program instructions, stored on at least one of the one or more computer-readable tangible data storage devices, to receive one or more inputs identifying each of one or more semantic constructs of the application model with at least one of the application model subsets, including the respective application model subset. The computing system further includes program instructions, stored on at least one of the one or more computer-readable tangible data storage devices, to generate one or more application model documentation topics for the semantic constructs in the one or more application model subsets for the one or more audiences. The computing system further includes program instructions, stored on at least one of the one or more computer-readable tangible data storage devices, to generate the one or more application model build artifacts based on the respective application model subsets associated with the semantic constructs identified within the respective application model subsets. The computing system further includes program instructions, stored on at least one of the one or more computer-readable tangible data storage devices, to generate one or more application model documentation artifacts based on the application model.

In another example, a computer program product includes one or more computer-readable tangible data storage media and program instructions stored on at least one of the one or more computer-readable tangible storage media. The computer program product includes program instructions, stored on at least one of the one or more computer-readable tangible data storage media, to receive one or more inputs identifying one or more application model subsets. The computer program product further includes program instructions, stored on at least one of the one or more computer-readable tangible data storage media, to receive one or more inputs identifying one or more audiences. The computer program product further includes program instructions, stored on at least one of the one or more computer-readable tangible data storage media, to receive, for at least one respective audience from the one or more audiences, at least one input associating a respective application model subset from the one or more application model subsets with the respective audience. The computer program product further includes program instructions, stored on at least one of the one or more computer-readable tangible data storage media, to receive one or more inputs identifying each of one or more semantic constructs of the application model with at least one of the application model subsets, including the respective application model subset. The computer program product further includes program instructions, stored on at least one of the one or more computer-readable tangible data storage media, to generate one or more application model documentation topics for the semantic constructs in the one or more application model subsets for the one or more audiences. The computer program product further includes program instructions, stored on at least one of the one or more computer-readable tangible data storage media, to generate the one or more application model build artifacts based on the respective application model subsets associated with the semantic constructs identified within the respective application model subsets. The computer program product further includes program instructions, stored on at least one of the one or more computer-readable tangible data storage media, to generate one or more application model documentation artifacts based on the application model.

The details of one or more embodiments are set forth in the accompanying drawings and the description below. Other features, objects, and advantages will be apparent from the description and drawings, and from the claims.

DETAILED DESCRIPTION

There are set forth herein examples of techniques, methods, computing systems, and computer program products to provide automated generation of application model build artifacts based on an application model. An application model build artifact may be created to define a web service interface to a particular product, for example. An application model build artifact can be used to define semantics for an interface with the application, and to manage documentation for the interface, such as tutorial materials, reference materials, change history, release notes, and so on. The documentation may include various documentation topics that may be intended to be consumed by one or more consumers or audiences, such as "clients", "developers", "administrators", and so on. Various illustrative features and advantages for automated generation of an application model build artifact are further described below with reference to FIGS. 1-6.

Figure 1:
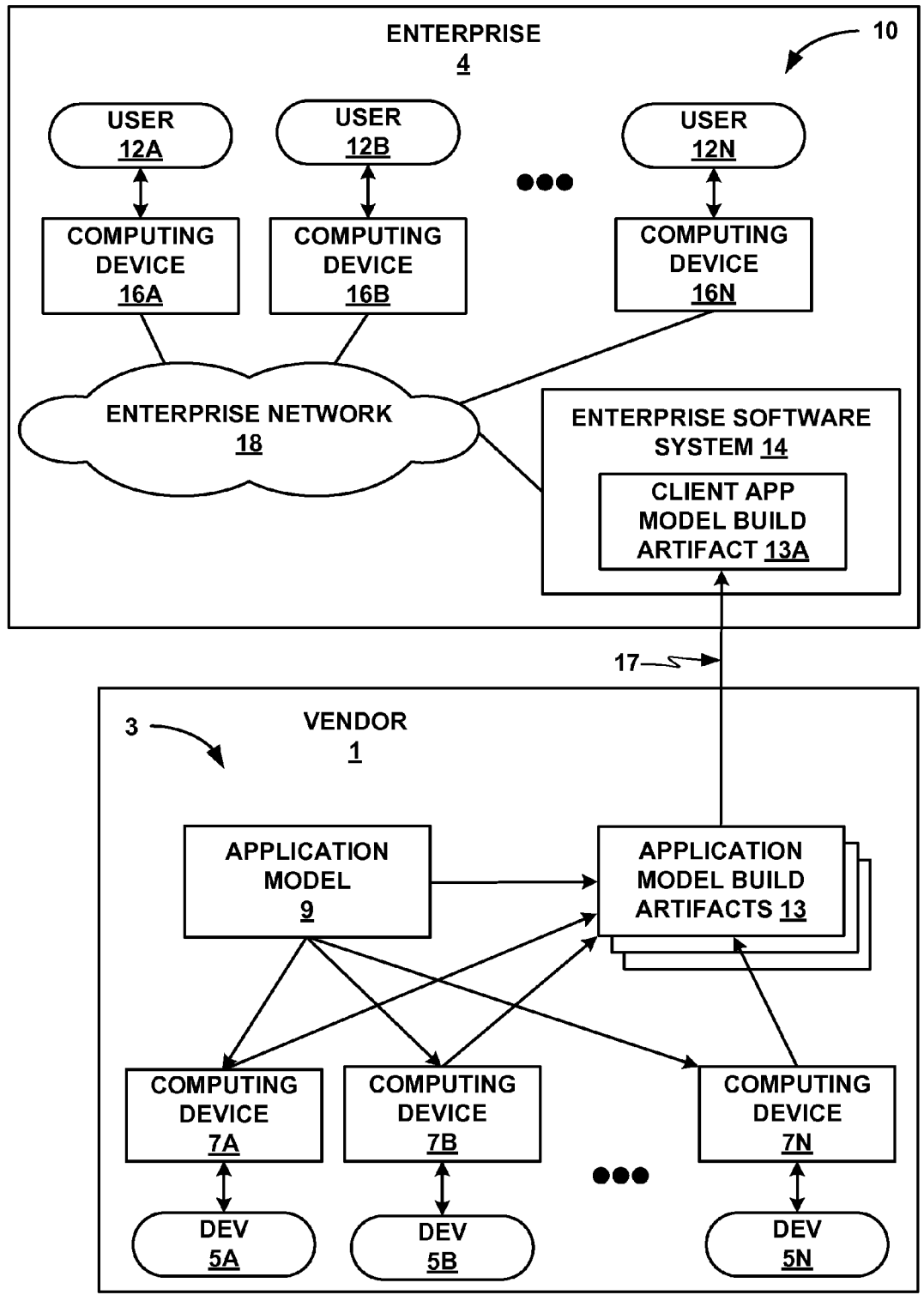
FIG. 1 is a block diagram illustrating an example vendor having a vendor computing environment used to generate application model build artifacts, and an enterprise having an enterprise computing environment that makes use of at least one of the application model build artifacts.

FIG. 1 illustrates an example context in which techniques disclosed herein may be used. FIG. 1 is a block diagram illustrating an example vendor 1 and an example enterprise 4 that is a client of vendor 1. Vendor 1 has a computing environment 3 in which a plurality of developers 5A-5N (collectively, "developers 5") produce and/or maintain an application model 9. The vendor computing environment 3 includes various computing devices 7A-7N (collectively, "computing devices 7"), that may include personal computing devices, servers, etc., that developers 7 may use in developing or maintaining application model 9. Developers 5 may work with application model 9 to prepare application model 9 to generate application model build artifacts 13.

Enterprise 4 has an enterprise computing environment 10 in which a plurality of users 12A-12N (collectively, "users 12") use computing devices 16A-16N (collectively, "computing devices 16") to interact with an enterprise software system 14. In the system shown in FIG. 1, enterprise software system 14 is communicatively coupled to computing devices 16 by a network 18. Users 12 interact with their respective computing devices 16 to access enterprise software system 14.

In this example, vendor 1 may provide one or more application model build artifacts 13, such as application model build artifact 13A, to enterprise 4 for installation in enterprise server system 14. This may include an original installation and/or subsequent updates of all or portions of an application model build artifact 13A to enterprise server system 14. FIG. 1 shows vendor 1 sending or uploading application model build artifact 13A to enterprise 4 via communicative connection 17 between vendor computing environment 3 and enterprise software system 14. Application model build artifact 13A may be a copy or clone of one of an application model build artifact 13A generated by vendor computing environment 3, e.g., by one or more of computing devices 7. This communicative connection 17 may include a connection over the Internet or other network in one illustrative example, while vendor 1 and enterprise 4 may use any of various means in other examples for communicating and/or installing application model build artifacts 13 to enterprise system 14.

One example of the techniques of this disclosure may be in reference to an enterprise business intelligence system, such as an enterprise order management system, or project and resource management system, for example. The techniques described herein may be readily applied to other software systems, including other large-scale enterprise software systems. Examples of enterprise software systems include financial or budget planning systems, inventory management systems, sales force management systems, business intelligence tools, enterprise reporting tools, and other enterprise software systems.

In a typical example in which client application model build artifact 14A is for an enterprise business intelligence system, users 12 may view and manipulate multidimensional data via their respective computing devices 16. The data is "multidimensional" in that each multidimensional data element is defined by a plurality of different object types, where each object is associated with a different dimension. Users 12 may, for example, run existing reports or create new reports to satisfy requirements for data analysis. Such reports may be based on abstract query subjects and query items that are used to construct queries, such as Online Analytical Processing (OLAP) queries, that may be executed by underlying data providers for querying multidimensional data. Such a report may be used, for example, to retrieve data related to store sales by entering a name of a sales person, a store identifier, a date, a product, and a price at which the product was sold.

Figure 2:
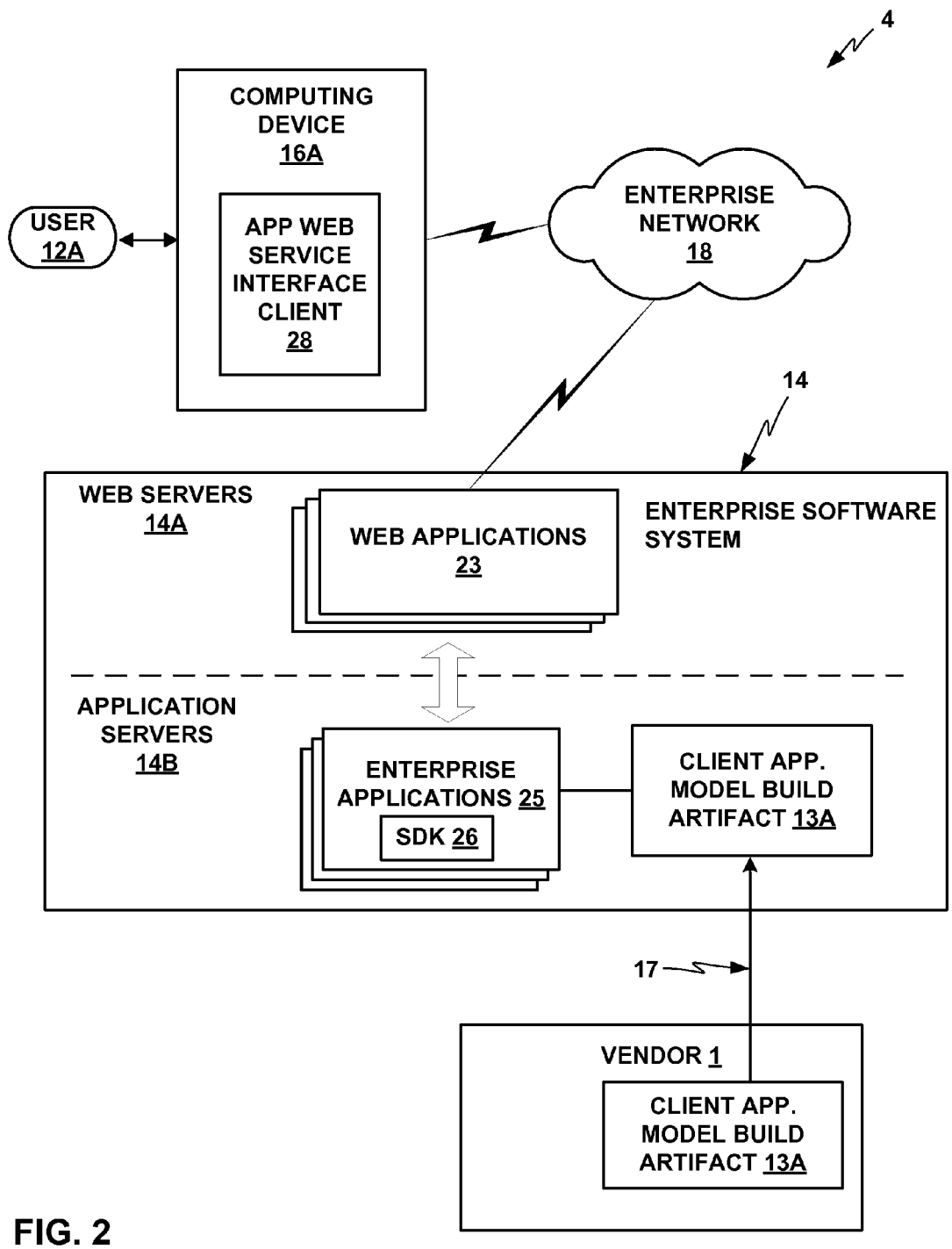
FIG. 2 is a block diagram illustrating an example enterprise computing environment using an application model build artifact generated by a vendor.

FIG. 2 is a block diagram illustrating in further detail portions of one example of an example enterprise computing environment 4 making use of a client application model build artifact 13A. In a particular example, enterprise software system 14 includes an application software development kit (SDK) 26 that is based on a client application model build artifact 13A as shown in FIG. 1, which may be an updated application model build artifact sent as an update to enterprise software system 14 from BI vendor 1. Enterprise software system 14 may be implemented in accordance with an architecture that includes one or more web servers 14A that provide user interface functions, and one or more application servers 14B that provide an operating environment for business logic and enterprise software applications 25, including application SDK 26 based on application model build artifact 13A provided by vendor 1. In some examples, enterprise software system 14 may also use data source servers that host data sources such as relational databases and/or multidimensional databases.

In the example implementation depicted in FIG. 2, a single client computing device 16A is shown for purposes of example. Client computing device 16A includes an enterprise application web service interface client 28, which may be a web browser or a dedicated interface application, in different examples. Application web service interface client 28 may be configured for interacting with and rendering a user interface for enterprise software system 14. Application web service interface client 28 may be configured for user 12A to interact with SDK 26 based on application model build artifact 13A provided by vendor 1, and to implement a variety of functions using enterprise software system 14.

Enterprise business intelligence system 14 includes one or more web servers 14A that provide an operating environment for web applications 23 that provide user interface functions to user 12A and computing device 16A. One or more application servers 14B provide an operating environment for enterprise software applications 25 running on application servers 14B, including one or more application model build artifacts 13 such as client application model build artifact 13A.

Figure 3:
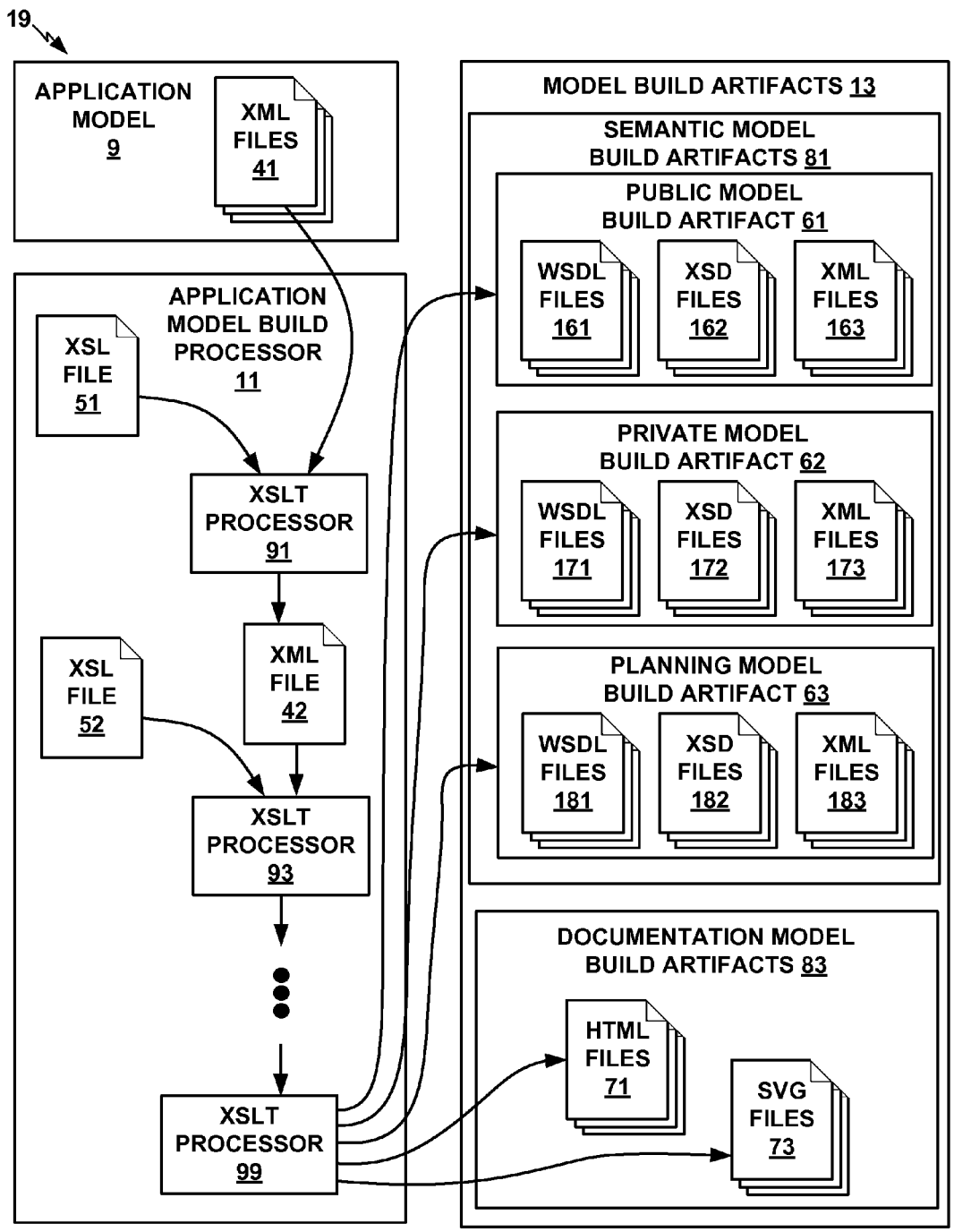
FIG. 3 is a conceptual diagram illustrating an example process for processing an application model to generate application model build artifacts.

FIG. 3 is a conceptual diagram illustrating an example process 19 of vendor computing environment 3 processing an application model 9 into application model build artifacts 13. Application model 9 includes semantic information and documentation topics, either or both of which may be included in XML files 41. Vendor computing environment 3 may process application model 9 to produce application model build artifacts 13 for consumption by other software systems or by human users, such as software systems within enterprise software system 14 and/or users 12 associated with enterprise 4. For example, vendor computing environment 3 performing process 3 may generate one or more Web Service Definition Language (WSDL) files 161, 171, 181 which may define a web service interface. One or more of WSDL files 161, 171, 181 may then be consumed by SOAP toolkits within enterprise software system 14.

Vendor computing environment 3 may include functionality of an application model build processor 11. Vendor computing environment 3 may provide data, such as XML files 41 from application model 9 in this example, to application model build processor 11 to process. Application model build processor 11 may then produce example application model build artifacts 13. In particular, application model build processor 11 may include one or more invocations of an Extensible Stylesheet Language Transformations (XSLT) processor 91, 93, etc.

Application model build processor 11 may provide one or more XML files 41 and one or more Extensible Stylesheet Language (XSL) files 51 to XSLT processor invocation 91. XSLT processor invocation 91 may generate a new XML file 42 based at least in part on the one or more XML files 41 and the one or more XSL files 51. This new XML file 42 and another XSL file 52 may then feed into another XSLT processor invocation 93, which may generate another new XML file based at least in part on the XML file 42 and the XSL file 52, in this example. In this and various other examples, therefore, for application model build processor 11 to generate the application model build artifacts 13 based on the application model 9 may include generating at least one application model build file, such as XML file 42 or any of the files included in application model build artifacts 13, based on at least one application model file, such as XML files 41, and at least one application model build processing file, such as XSL files 51, 52. Application model build processor 11 may repeat this process any number of times before concluding process 19, illustratively with a final XSLT processor invocation 99, and generating application model build artifacts 13, which may include a variety of types of model build files.

Application model build artifacts 13 may include both semantic model build artifacts 81 and documentation model build artifacts 83. Application model build artifacts 13 may include any of various particular model build artifacts, illustratively including a public model build artifact 61, a private model build artifact 62, and a planning model build artifact 63. Each of model build artifacts 61-63 may include one or more WSDL files (e.g., 161, 171, 181), one or more XML Schema Definition (XSD) files (e.g., 162, 172, 182), one or more XML files (e.g., 163, 173, 183), and potentially other semantic content.

Application model build processor 11 may also produce documentation model build artifacts 83 in the form of XML files, HTML files 71 or SVG files 73, for example, and which may provide documentation for any of semantic model build artifacts 81. Documentation model build artifacts 83 may provide a complete documentation set applicable to one or more of the semantic model build artifacts 61, 62, 63. Each of documentation model build artifacts 83 may describe all model subsets associated with a particular client audience. The content is tagged for particular audiences and model subsets so that a user can see the documentation for any subset/client audience combination defined in the model. End user documentation may be generated from one of documentation model build artifacts 83 through an additional process. Application model build processor 11 may also generate other application model build artifacts 13 that can also be used by an application that implements the web service interface client 28. Vendor computing environment 3 and/or SOAP toolkits or other elements of enterprise software system 14 may consume one or more of application model build artifacts 13 either at application build time or at application runtime, for example.

Documentation model build artifacts 83 may provide or be used to generate documentation material for human consumption. In some examples, another processing step or module may be used to consume one or more of documentation model build artifacts 83 and generate readable documentation materials ready for human consumption based on the one or more documentation model build artifacts 83. Application model build processor 11 may generate a great deal of reference documentation based on semantic portions of application model 9 during processing of application model 9.

By generating documentation for a particular application model build artifact 13 in an automated process based on semantic information and documentation of associated subsets of application model 9 during processing of application model 9, application model build processor 11 may improve development efficiency while allowing developers 5 to focus on tasks other than writing documentation. Generating documentation for a particular application model build artifact 13 in an automated process may also eliminate many simple errors that may occur when semantic information and documentation are maintained separately in the development of application model 9. The documentation for application model 9 may be thought of as a "living document" that is dependent on the semantic information in application model 9, and is therefore kept automatically synchronized with the semantic information in application model 9. The automatically generated documentation may be considered a third category of information in application model 9, besides semantic information and manually drafted documentation materials.

Vendor 1 may develop application model 9 with a general goal of maintaining a single definition of the web service interface for application model 9. However, vendor 1 may also make exceptions to this general goal for purposes such as maintaining aspects of application model 9 that are for internal use only within vendor computing environment 3, or that are customized for specific requirements of a particular enterprise computing environment 10. For example, certain web service methods, data types, or data type properties may be intended for internal use only within vendor computing environment 3. As another example, vendor 1 may form subsets of application model 9, such as subsets of the web service interface for application model 9, for consumption by various teams of developers 5 for various technical reasons. Each of these subsets is a subset of the entire application model 9. One way to manage development of these subsets is to manage each of them separately, using shared source files. However, the procedures to manage each of these subsets separately using shared source files may become tedious and error-prone. Additionally, when managing the subsets separately using shared source files, making a change to the application model 9 may typically involve building each of the subsets sequentially, which may slow development and increase costs.

Systems of this disclosure may provide alternative methods for managing the subsets of application model 9 in application model build processor 11. Application model build processor 11 may build application model build artifacts 13 for each of the subsets of application model 9 with one invocation of the model processing logic, which may reduce costs and reduce errors. The application model build processor 11 may use this new instance data to produce all of the required application model build artifacts 11 for each of the subsets, including generated documentation, in a single invocation. Using this technique, in some examples, a new subset and/or a corresponding application model build artifact 81 may be defined for a product release in a matter of hours instead of days.

Application model 9 may receive inputs, such as subset membership constructs, from developers 5 that identify or define one or more application subsets, in various examples of this disclosure. Each of one or more semantic constructs of application model 9 may receive a subset membership construct from developers 5 that tags or identifies that semantic construct as belonging to or associated with the subset identified by the subset membership construct. Each application subset of the application model 9 may be built for a particular purpose or for a particular consumer, including both client consumers and internal consumers such as developers 5. Each subset may be assigned its own name and may overlap with other application subsets. Each subset may also contain details such as a file prefix for built application model build artifacts 13 based on that subset, as well as specifications that control how WSDL files 161, 171, 181 for the subset are built (e.g., specifications for SOAP encoding and/or Multipurpose Internet Mail Extensions (MIME) support). Application build processor 11 may also include a "target subset list" in examples of this disclosure. The target subset list is a list of subsets that are built when the application model 9 is processed. Constructs in the semantic portion of the application model 9 may be tagged to indicate which subsets should include the construct. If not specified, the construct may inherit the specification of the containing construct, which may improve efficiency. For example, in many classes, properties may inherit the target subset specification of the containing class.

Application model 9 may also receive inputs from developers 5 that identify or define audiences in examples of this disclosure. An audience may indicate the intended audience of topics in the documentation, where each topic may be intended for one or more, and potentially all, of the listed audiences. For example, the audiences may include one or more "developer" or "internal" class audiences indicated for internal use within vendor 1, and may also include one or more "client" class audiences intended for clients such as enterprise 4 or particular types of users within enterprise 4, and which may indicate customizations specific to particular clients' requirements or specifications.

Application model 9 may also receive inputs from developers 5 that identify associations between application model subsets and audiences. With the identification of model subsets and audiences, the associations defined between the model subsets and audiences, and the constructs in the application model 9 identified with one or more of the model subsets, application model 9 supports model build processing for desired subsets and audiences.

The tagged semantic constructs in application model 9 may include documentation topics that may be tagged as being identified with one or more of the audiences. Identifying tags, or identifiers, in the semantic constructs may leverage an inheritance mechanism that may be used for model subsets. In this way, a child construct may inherit the intended model subsets from its parent construct, for example. Documentation topics may be contained within semantic constructs, and may be tagged with audience identifiers associating the topics with one or more audiences. More generally, any semantic construct of application model 9 that is not tagged with its own subset membership construct and that has an ancestor semantic construct may automatically inherit the subset membership construct of its closest ancestor semantic construct. Additional rules may be applied in the absence of individually applied subset membership constructs. For example, a semantic construct that contains no subset membership constructs, either individually applied or inherited, at processing time, may be included by default in all model subsets. This use of model subset tags, combined with the separate association of audiences with model subsets, may therefore advantageously resolve a need to build documentation for specific audiences for specific subsets of application model 9.

Using aspects such as those described above, in processing application model 9, application model build processor 11 may define portions of the semantic content in application model 9, and identify which of one or more or potentially all audiences are intended for the various documentation topics. To generate the right documentation content, application model build processor 11 may use the defined associations between the target subsets and the audiences. Doing so may save processing time as well as limit the bulk of the files in application model 9, such as XML files 41. A single audience may be associated with one or more model subsets, and the generated documentation for that audience may reflect the union of those model subsets. All of the documentation for all audiences or consumers may be generated in the same model output document. If sibling topics generated for different audiences are identical, the production process may combine them into a single topic by assigning the union of the consumer lists for the topics to the combined topic. Doing so may also reduce the number and size of the files in documentation model build artifacts 71 and 73.

Application model build processor 11 may therefore process application model 9 to generate model build artifacts and documentation artifacts for every subset every time it is invoked. In another example, process application model 9 may generate a particular application model build artifact 13 for any one of multiple listed consumers, including internal-class consumers and client-class consumers, and automatically generate documentation that is specifically tailored to that particular application model build artifact 13, by processing only documentation topics that are tagged within application model 9 with tags for the particular model subset associated with the particular intended audience. This may include scheduling the repeated execution of the build process for recurring generation of documentation for internal use by developers 5 within vendor 1, such that developers 5 can refer to documentation that is automatically up-to-date. This may also include automatic generation of documentation specifically tailored for a particular client and for a particular application model build artifact 13, such that the documentation is automatically both up-to-date and specifically tailored for that application model build artifact 13 when it is built and shipped. This may ensure that the documentation is up-to-date for all clients and artifacts. While this resolves the need to assemble the documentation for that application model build artifact 13 manually, developers 5 may also perform a final step of curating or finalizing the automatically generated documentation for external clients such as enterprise 4.

Application model build processor 11 may follow certain rules in processing application model 9. For example, application model build processor 11 may use subset identifiers and tags that define subsets of application model 9. Processing the semantic information may be relatively straightforward during the build process as the information is used to filter the semantic constructs during construction of the various application model build artifacts 13. The associations between model subsets and audiences may define what documentation is generated for each application model build artifact 13 and may limit the content of each generated topic. Some documentation topics may vary because some semantic constructs may not be in a particular model subset and therefore may not be referenced in the applicable application model build artifact 13.

Figure 4:
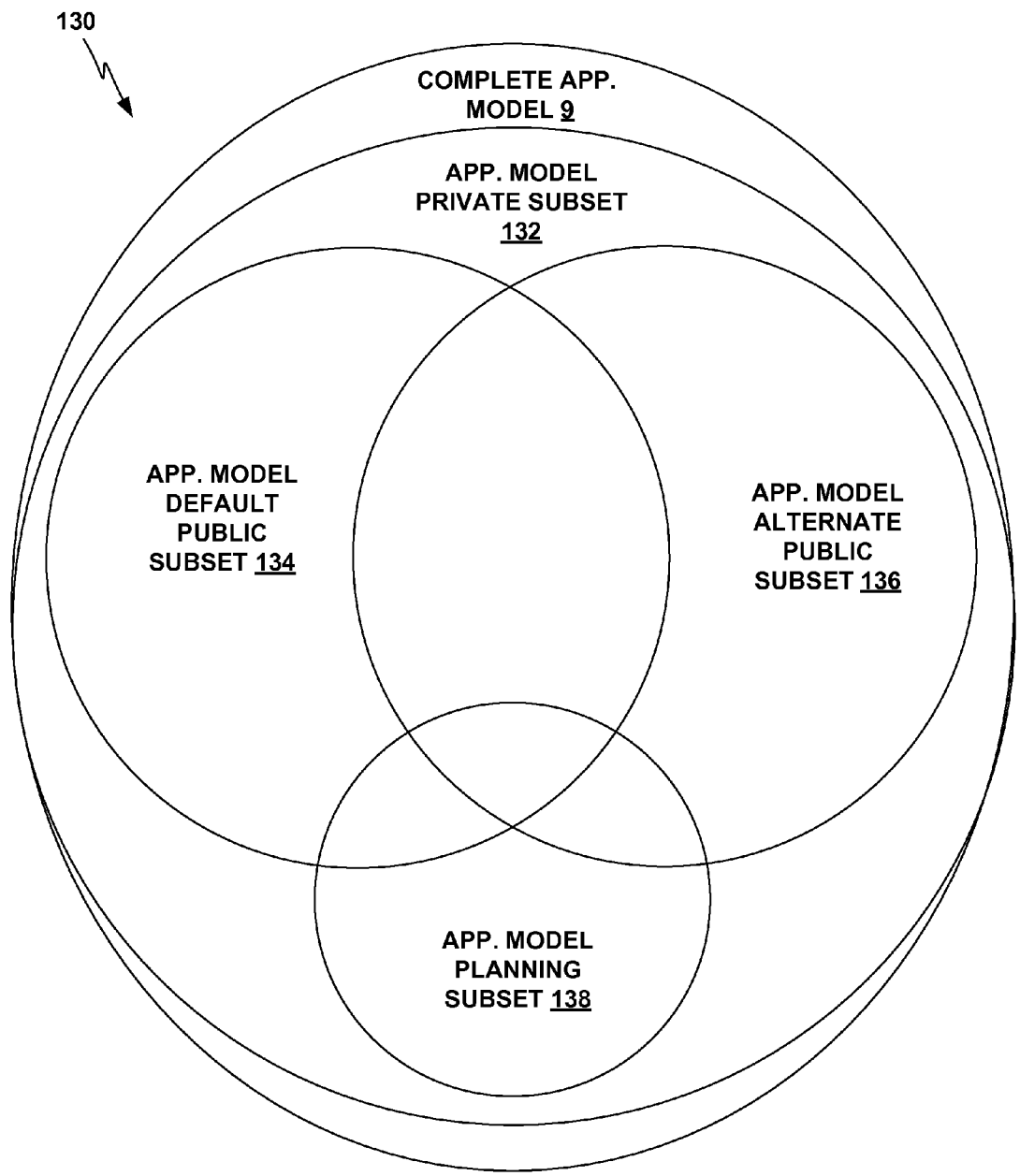
FIG. 4 is a Venn diagram showing how various application model subsets may be related in one example.

FIG. 4 is a Venn diagram 130 showing how various application model subsets may be related, relative to the complete application model 9, containing all of the semantic constructs in application model 9, in one example. In this example, four target subsets are defined: "Planning," "Private," "Default Public," and "Alternate Public," and described as follows for an illustrative example. The Private subset is likely to include the greatest proportion of the semantic constructs, and may coincide with the entire application model 9, and may be intended for internal use only. The Default Public target subset is an application model subset intended as a default client application model subset, to be seen by product clients using the application software development kit (SDK) to perform specific tasks. The Planning subset is a model subset that is intended for internal use within vendor 1, specifically intended for use by an internal team of developers 5 focused on planning software components of application model 9.

This example may also include definitions for four types of audiences: "Default Developer," "Planning Developer," "Default Client", and "Administrator," described as follows for this illustrative example. The Default Developer audience represents the general set of developers 5 internal to vendor 1. The Planning Developer audience represents a particular team of developers 5 internal to vendor 1 who are involved with planning future development of application model 9. The Default Client audience represents general client consumers of the application, such as enterprise 4 using enterprise software system 14, and may be particularly for those external clients who use the software development kit (SDK). The Administrator audience represents system administrators with requirements for using the SDK for system administration functionality, as one particular example of a customized audience. Various application model subsets may be mapped by associations to various audiences, as listed in Table 1:

TABLE 1

| Subset | Audience |
| --- | --- |
| Private Subset 132 | Default Developer |
| Default Public Subset 134 | Default Developer |
| Default Public Subset 134 | Default Client |
| Alternate Public Subset 136 | Default Developer |
| Alternate Public Subset 136 | Administrator |
| Planning Subset 138 | Planning Developer |

Private subset 132 is directed to the majority or entirety of application model 9 and is mapped or associated in this instance to the Default Developer consumer, such that the system will generate default developer documentation for the private subset of semantic constructs, in this example. Public subset 134 is defined as a default public subset for clients, which includes much but not all of the information in application model 9, omitting any information that is intended for internal use only by the developers 5 within vendor 1, for example. Alternate public subset 136 is one example of a particularly customized application model build intended for a non-default audience with special requirements for non-default functionality, e.g. functionality specific to an administrator in this example. Additional alternate public subsets may be defined for other customized application model builds intended for other audiences with special requirements for non-default functionality, such as Online Analytical Processing (OLAP) functionality for a business intelligence (BI) application model build artifact, for example. This may include functionality for Multidimensional OLAP (MOLAP) systems configured for interacting with multidimensional data sources, or Relational OLAP (ROLAP) systems configured for interacting with relational data sources, for example.

Public subsets 134 and 136 are also mapped to the Default Developer audience in this example, or may also be mapped to specifically defined developer audiences in the instance of developers who are particularly involved with working on various functionalities. Planning subset 138 is mapped to a Planning Developer consumer, as one example of defining and mapping to a non-default internal class (or developer class) audience. The Planning subset may include only a limited subset of semantic constructs specifically useful for planning future releases. As shown in FIG. 4, much of the material for each of the public subsets may overlap each other, while each may also include material that is not included in one or more, or any, of the other subsets, while the Private subset 132 may be defined to include the entirety of the information from BI application model 9, in some examples. In other examples, an application model 9 may also include material that is not all included in a private subset for general or default use among the developers of a vendor, such that a private subset may be defined as only an incomplete subset within the entirety of the material of an application.

When generating the documentation for a semantic construct, for each defined audience in the model, an application model build processor 11 may find all model subsets associated with that audience. If the construct is in one of those subsets, application model build processor 11 may find the appropriate set of semantic constructs in any of the subsets for the documentation that is being generated, generate the topic, and tag it with the audience. Application model build processor 11 may then do a pair-wise comparison of the topics, and if content is identical, then combine the topics by merging the consumer lists, and discard one topic of the pair. This process may generate many topics that are identical and remove duplicates after they are generated, and may be simpler than trying to figure out if the generated topics will be identical before generating them. Thus, the semantic constructs are included in the model build artifact based on model subsets, the topics may be based on audiences, and the generated documentation may be based on the associations between the semantic constructs and the topics.

An example of information that may be tagged and included in one subset and omitted in another subset is provided as follows. Two documentation topics may be generated for a class asynchDetail defined in the application model 9. The two generated documentation topics may list the classes derived from this class. The first documentation topic may be intended for internal-class consumers such as the Default Developer consumer, and the second documentation topic may be intended for client-class consumers such as a consumer class defined for a Relational Online Analytical Processing (ROLAP) Client consumer, as one illustrative example. One or more classes may be intended only for internal-class consumers. Brief portions of two versions of a list of classes are provided below, with the first version representing information in Private subset 132, which may be mapped to internal-class consumers, and the second version representing information in a particular public subset, such as default public subset 134, which may be mapped to particular client-class consumers. The first version includes information on one particular derived class, asynchDetailQueryInternalExample, that is used only for work on developing application model 9 and is only intended for internal use within vendor 1. This class appears only in the documentation topic intended for a developer audience because it is part of the 'Private' subset. The example documentation portion reads as follows:

Derived Classes:

--- bibus » asynchDetailContext
bibus » asynchDetailEventID
bibus » asynchDetailQueryInternalExample
bibus » asynchDetailReportOutput
bibus » asynchDetailROLAPDataSourceExample

---

The corresponding portion of the documentation topic for alternate public subset 136, which may be mapped to the ROLAP Client audience, reads as follows, omitting the information tagged only for internal-class consumers:

Derived Classes:

--- bibus » asynchDetailContext
bibus » asynchDetailEventID
bibus » asynchDetailReportOutput
bibus » asynchDetailROLAPDataSourceExample

---

In this example, the documentation topic also includes information on the derived class asynchDetailROLAPDataSourceState, focused on ROLAP functionality, which may be included in the assembly tagged for the ROLAP Client consumer, but not for the Default Client consumer, for example.

Aspects of this disclosure therefore may provide advantages such as generating application model build artifacts based on application model 9 without creating additional models or incurring the costs of additional model builds when a new application model build artifact is required, obviating the need for the large amount of setup work that may be required to introduce a new build. Aspects of this disclosure also advantageously enable automatically generated documentation for application model 9 always to be automatically up-to-date, and reflect the current state of application model 9, as well as the state of the partitioning of application model 9 and the intended audience of an application model build artifact 13.

Figure 5:
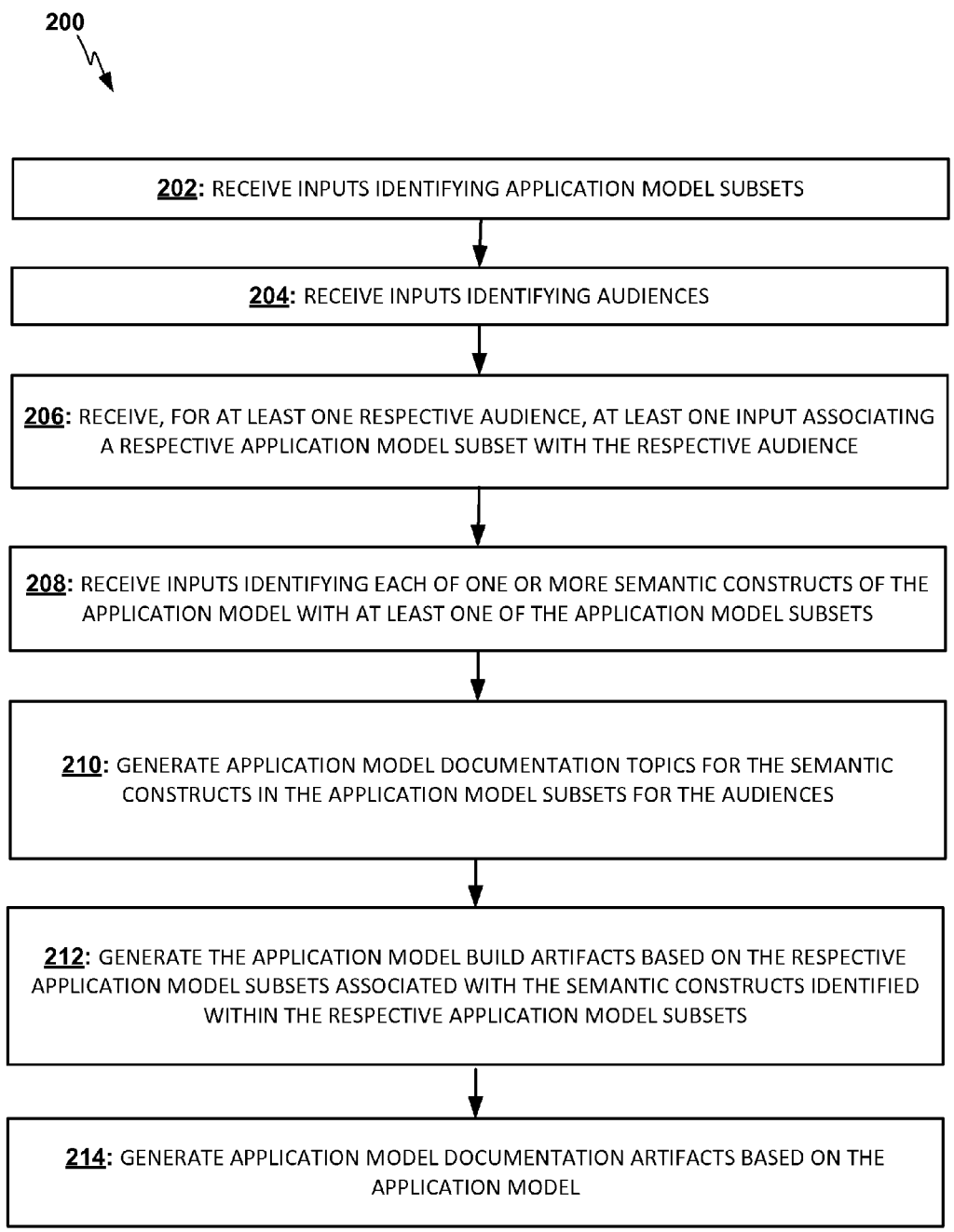
FIG. 5 is a flowchart illustrating operation of an example method for processing an application model to generate application model build artifacts.

FIG. 5 is a flowchart illustrating operation of an example method 200, such as may be performed using application model 9 and application model build processor 11 for processing an application model 9 that comprises semantic information and documentation. A computing system such as one or more computing devices 7 in vendor computing environment 3 may perform method 200 to process application model 9 into one or more application model build artifacts 13.

As shown in FIG. 5, a computing device, such as one or more of computing devices 7, may receive inputs identifying one or more application model subsets, such as subsets 132, 134, 136, 138, in application model 9 (202). The computing device may receive inputs identifying one or more audiences, such as developer class audiences and client class audiences (204). The computing device may receive, for at least one respective audience from the one or more audiences, at least one input associating a respective application model subset from the one or more application model subsets with the respective audience (206). The computing device may generate one or more application model documentation topics for the semantic constructs in the one or more application model subsets for the one or more audiences (208). The computing device may generate one or more application model build artifacts 13 based on the respective application model subsets associated with the semantic constructs identified within the respective application model subsets (210). The computing device may then generate one or more application model documentation artifacts based on the application model 9 (212). Generating the one or more application model build artifacts may include identifying each of the one or more application model build artifacts with a respective audience from the one or more audiences, and generating each of the one or more application model build artifacts based on the respective application model subset associated with the respective audience and the semantic constructs identified with the respective application model subset.

Figure 6:
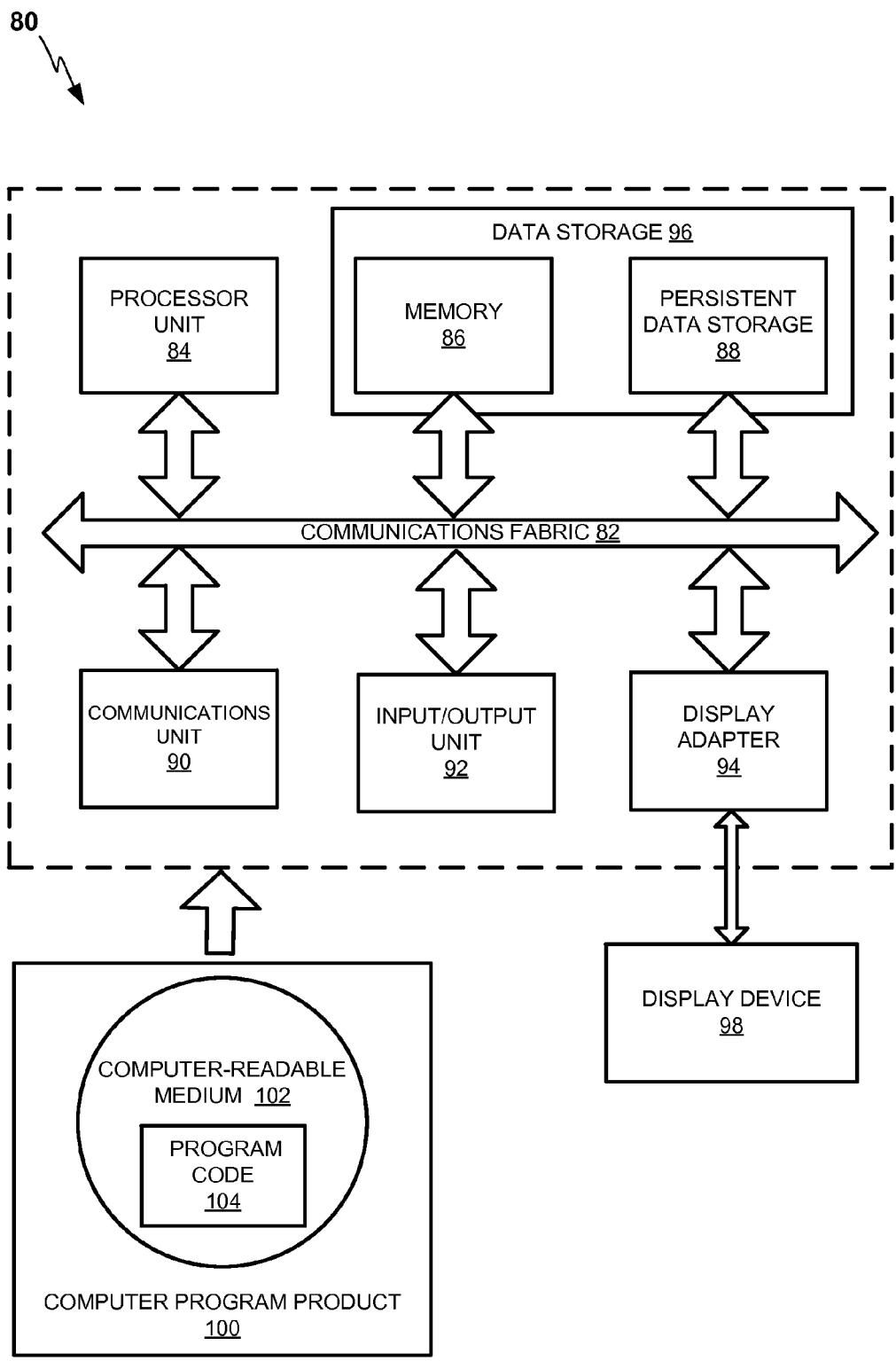
FIG. 6 is a block diagram of an example computing device that may run an application for processing an application model to generate application model build artifacts.

FIG. 6 is a block diagram of an example computing device 80 that may run an application for processing an application model to generate application model build artifacts, and that may implement all or part of method 200 shown in FIG. 5. Computing device 80 may be a workstation, server, mainframe computer, notebook or laptop computer, desktop computer, tablet, smartphone, feature phone, or other programmable data processing apparatus of any kind. Computing device 80 of FIG. 6 may represent servers or other computing devices belonging to vendor computing environment 3 as depicted in FIG. 1 and/or application model build processor 11 as depicted in FIG. 3, for example. Servers for vendor computing environment 3 of FIG. 1 may also be implemented as virtual servers, which may execute on computing device 80 of FIG. 6, or on multiple computing devices that may include computing device 80 of FIG. 6. Any combination or all of the processes and capabilities disclosed herein may execute on computing device 80 or a combination of similar computing devices that may be implemented in a data center or a cloud data service with multiple redundant data centers, or in any other configuration. Other possibilities for computing device 80 are possible, including a computer having capabilities or formats other than or beyond those described herein.

In this illustrative example, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core, quad core, or other multiple core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while persons skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if for only a short duration or only in a volatile memory format.

Processor unit 84 can also be suitably programmed to read, load, and execute computer-executable instructions or computer-readable program code for a dynamic property data integration framework, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. Some of these examples may overlap with each other, or with example components of communications unit 90 or data storage 96. Input/output unit 92 may also include appropriate device drivers for any type of external device, or such device drivers may reside in the operating system or elsewhere on computing device 80 as appropriate.

Computing device 80 also includes a display adapter 94 in this illustrative example, which provides one or more connections for one or more display devices, such as display device 98, which may include any of a variety of types of display devices. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology. Computer program code 104 may include a computer program, module, or portion of code for processing an application model to generate application model build artifacts in a vendor computing environment or performing any other actions as described above.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be written, modeled, or conceptualized as computer-readable instructions at any of various levels of abstraction, such as a high-level programming language, assembly language, or machine language, but ultimately constitutes or causes a series of physical electrical and/or magnetic interactions that physically induce a change in the physical state of processor unit 84, thereby physically causing processor unit 84 to generate physical outputs that correspond to the computer-executable instructions, in a way that modifies computing device 80 into a new physical state and causes computing device 80 to physically assume new capabilities that it did not have until its physical state was changed by loading the executable instructions comprised in program code 104.

In some illustrative examples, program code 104 may be downloaded over a network to data storage 96 from another device or computer system, such as a server, for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

Computing device 80 of FIG. 6 may be an implementation of part of vendor computing environment 3 of FIG. 1. In FIG. 1, communicative connection 17 and enterprise network 18 and other communicative connections among the elements of vendor computing environment 3 and enterprise computing environment 10 may include one or more networks of any kind that may provide communications links between various devices and computers connected together within vendor computing environment 3 and/or enterprise computing environment 10. Communicative connection 17 and enterprise network 18 and other communicative connections in FIG. 1 may include connections, such as wire, wireless communication links, or fiber optic cables. In one example, communicative connection 17 and/or enterprise network 18 may include the Internet with a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Communicative connection 17 and/or enterprise network 18 may also be implemented as a number of different types of networks, such as for example, an intranet, a local area network (LAN), or a wide area network (WAN). FIG. 1 is an illustrative example, and not an architectural limitation for the variety of illustrative examples.

Vendor computing environment 3 and enterprise computing environment 10 may include any type of servers, and metadata and content store 36 may include any type of storage server, storage area network, redundant array of independent discs (RAID), storage device, cloud storage service, or any other type of data storage. BI vendor computing environment 3 and enterprise computing environment 10 may also include additional servers, clients, storage elements, network elements, and various other devices not shown in FIG. 1 that may also be involved in enabling techniques of this disclosure.

Computing devices 7 and 16 as depicted in FIG. 1 may be connected to servers of vendor computing environment 3 and/or enterprise computing environment 10 via any hardline, wireless, or network connection. Computing devices 7 and 16 may have various user input/output devices operatively connected to them to enable detecting user inputs and providing user-perceptible output, such as a touchscreen, a keyboard, a mouse, a monitor, and/or other input/output devices enabling developers 5 and users 12 to interact with vendor computing environment 3 and/or enterprise computing environment 10, respectively.

As persons skilled in the art will appreciate, aspects of the present invention may be embodied as a method, a computing system, or a computer program product, for example. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wireline, optical fiber cable, etc., or any suitable combination of the foregoing. Computer program code for carrying out operations for aspects of the present invention may be written in any combination of one or more programming languages, such as Java, Smalltalk, C, C++, C#, Objective-C, JavaScript, Python, Ruby, or any other language. One or more portions of applicable program code may execute partly or entirely on a user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures.

A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided as computer-executable code to a processor of a general purpose computer, special purpose computer, or other programmable data processing apparatus to produce a machine, such that the instructions, which execute via the processor of the computer or other programmable data processing apparatus, may create means for implementing the functions or acts specified in the flowchart and/or block diagram block or blocks.

These computer program instructions may also be stored in a computer readable medium that can cause a computer, other programmable data processing apparatus, or other devices to function in a particular manner, such that the executable instructions stored in the computer readable medium transform the computing device into an article of manufacture that embodies or implements the functions or acts specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer implemented process such that the instructions which execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). In some implementations, the functions noted in the block may occur out of the order noted in the figures. For example, two blocks shown in succession may, in fact, be executed substantially concurrently, or the blocks may be executed in a different order, or the functions in different blocks may be processed in different but parallel threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or in any combination of special purpose hardware and computer-executable instructions running on general purpose hardware.

The description of the present disclosure has been presented for purposes of illustration and description, and is not intended to be exhaustive or limited to the disclosure in the form disclosed. Many modifications and variations will be understood by persons of ordinary skill in the art based on the concepts disclosed herein. The particular examples described were chosen and disclosed in order to explain the principles of the disclosure and example practical applications, and to enable persons of ordinary skill in the art to understand the disclosure for various embodiments with various modifications as are suited to the particular use contemplated. The various examples described herein and other embodiments are within the scope of the following claims.

What is claimed is:

1. A computing system comprising:
one or more processors;
one or more non-transitory computer-readable data storage devices;
program instructions, stored on at least one of the one or more computer-readable tangible data storage devices, to receive one or more inputs identifying one or more application model subsets of an application model;
program instructions, stored on at least one of the one or more computer-readable tangible data storage devices, to receive one or more inputs identifying one or more audiences;
program instructions, stored on at least one of the one or more computer-readable tangible data storage devices, to receive, for at least one respective audience from the one or more audiences, at least one input associating one or more respective application model subsets from the one or more application model subsets with the at least one respective audience;
program instructions, stored on at least one of the one or more computer-readable tangible data storage devices, to receive one or more inputs identifying each of one or more semantic constructs of the application model with at least one of the application model subsets, including the one or more respective application model subsets;
program instructions, stored on at least one of the one or more computer-readable tangible data storage devices, to generate one or more application model documentation topics from the application model for the one or more semantic constructs identified with the one or more respective application model subsets associated with the at least one respective audience;
program instructions, stored on at least one of the one or more computer-readable tangible data storage devices, to generate one or more application model build artifacts based on one or more of the respective application model subsets associated with the one or more semantic constructs identified with the one or more respective application model subsets; and
program instructions, stored on at least one of the one or more computer-readable tangible data storage devices, to generate one or more application model documentation artifacts based on one or more of the application model documentation topics applicable to the one or more application model build artifacts.

2. A computer program product comprising:
one or more non-transitory computer-readable data storage media;

program instructions, stored on at least one of the one or more computer-readable tangible data storage media, to receive one or more inputs identifying one or more application model subsets of an application model;

program instructions, stored on at least one of the one or more computer-readable tangible data storage media, to receive one or more inputs identifying one or more audiences;

program instructions, stored on at least one of the one or more computer-readable tangible data storage media, to receive, for at least one respective audience from the one or more audiences, at least one input associating one or more respective application model subsets from the one or more application model subsets with the at least one respective audience;

program instructions, stored on at least one of the one or more computer-readable tangible data storage media, to receive one or more inputs identifying each of one or more semantic constructs of the application model with at least one of the application model subsets, including the one or more respective application model subsets;

program instructions, stored on at least one of the one or more computer-readable tangible data storage media, to generate one or more application model documentation topics from the application model for the one or more semantic constructs identified with the one or more respective application model subsets associated with the at least one respective audience;

program instructions, stored on at least one of the one or more computer-readable tangible data storage media, to generate one or more application model build artifacts based on one or more of the respective application model subsets associated with the one or more semantic constructs identified with the one or more respective application model subsets; and program instructions, stored on at least one of the one or more computer-readable tangible data storage media, to generate one or more application model documentation artifacts based on one or more of the application model documentation topics applicable to the one or more application model build artifacts.

3. The computing system of claim 1, wherein receiving the inputs identifying the one or more application model subsets comprises receiving identifying constructs in the application model, wherein each of the identifying constructs contains an identifier of one of the application model subsets.

4. The computing system of claim 1, wherein receiving the inputs identifying the one or more audiences comprises receiving identifying constructs in the application model, wherein each of the identifying constructs contains an identifier of one of the one or more audiences.

5. The computing system of claim 1, wherein receiving the input associating the respective application model subset with the respective audience comprises receiving an identifying construct in the application model, wherein the identifying construct contains an identifier of the respective application model subset and an identifier of the respective audience.

6. The computing system of claim 1, wherein receiving the inputs identifying each of one or more semantic constructs of the application model with at least one of the application model subsets comprises receiving identifying constructs in the semantic constructs, wherein each of the identifying constructs contains an identifier of one of the application model subsets.

7. The computing system of claim 6, further comprising: program instructions, stored on at least one of the one or more computer-readable tangible data storage devices, to identify at least one additional semantic construct of the application model with the at least one of the application model subsets, in response to the at least one additional semantic construct lacking an identifying construct but having a closest ancestor semantic construct that contains one of the identifying constructs containing an identifier of the at least one of the application model subsets.

8. The computing system of claim 6, further comprising: program instructions, stored on at least one of the one or more computer-readable tangible data storage devices, to identify at least one additional semantic construct of the application model with a default application model subset from the application model subsets, in response to the at least one additional semantic construct lacking an identifying construct and lacking an ancestor semantic construct that contains an identifying construct.

9. The computing system of claim 1, wherein generating the one or more application model build artifacts based on the application model comprises:
    generating semantic application model build artifacts for each of the application model subsets; and
    generating a documentation model build artifact for the application model.

10. The computing system of claim 9, wherein the semantic application model build artifacts comprise at least one file from among at least one Web Service Definition Language (WSDL) file, at least one XML Schema Definition (XSD) file, or at least one Extensible Markup Language (XML) file, and wherein generating the documentation model build artifact comprises:
    including documentation topics from the application model;
    generating documentation topics for each of the application model subsets wherein each of the generated documentation topics is associated with at least one of the audiences; and
    generating a documentation file based on the documentation model build artifact.

11. The computing system of claim 1, further comprising program instructions, stored on at least one of the one or more computer-readable tangible data storage devices, to generate topics for semantic constructs for application model documentation for the one or more application model build artifacts, wherein generating the topics comprises:
    determining application model subsets that contain a respective semantic construct;
    determining audiences associated with the application model subsets determined to contain the respective semantic construct;
    generating a topic for each of the audiences containing content related to a union of subsets associated with the audience; and
    merging topics containing identical content.

12. The computer program product of claim 2, wherein receiving the inputs identifying the one or more application model subsets comprises receiving identifying constructs in the application model, wherein each of the identifying constructs contains an identifier of one of the application model subsets.

13. The computer program product of claim 2, wherein receiving the inputs identifying the one or more audiences comprises receiving identifying constructs in the application model, wherein each of the identifying constructs contains an identifier of one of the one or more audiences.

14. The computer program product of claim 2, wherein receiving the input associating the respective application model subset with the respective audience comprises receiving an identifying construct in the application model, wherein the identifying construct contains an identifier of the respective application model subset and an identifier of the respective audience.

15. The computer program product of claim 2, wherein receiving the inputs identifying each of one or more semantic constructs of the application model with at least one of the application model subsets comprises receiving identifying constructs in the semantic constructs, wherein each of the identifying constructs contains an identifier of one of the application model subsets.

16. The computer program product of claim 15, further comprising:
   program instructions, stored on at least one of the one or more computer-readable tangible data storage media, to identify at least one additional semantic construct of the application model with the at least one of the application model subsets, in response to the at least one additional semantic construct lacking an identifying construct but having a closest ancestor semantic construct that contains one of the identifying constructs containing an identifier of the at least one of the application model subsets.

17. The computer program product of claim 15, further comprising:
   program instructions, stored on at least one of the one or more computer-readable tangible data storage media, to identify at least one additional semantic construct of the application model with a default application model subset from the application model subsets, in response to the at least one additional semantic construct lacking an identifying construct and lacking an ancestor semantic construct that contains an identifying construct.

18. The computer program product of claim 2, wherein generating the one or more application model build artifacts based on the application model comprises:
   generating semantic application model build artifacts for each of the application model subsets; and
   generating a documentation model build artifact for the application model.

19. The computer program product of claim 18, wherein the semantic application model build artifacts comprise at least one file from among at least one Web Service Definition Language (WSDL) file, at least one XML Schema Definition (XSD) file, or at least one Extensible Markup Language (XML) file, and wherein generating the documentation model build artifact comprises:
including documentation topics from the application model;
   generating documentation topics for each of the application model subsets wherein each of the generated documentation topics is associated with at least one of the audiences; and
   generating a documentation file based on the documentation model build artifact.

20. The computer program product of claim 2, further comprising program instructions, stored on at least one of the one or more computer-readable tangible data storage media, to generate topics for semantic constructs for application model documentation for the one or more application model build artifacts, wherein generating the topics comprises:
   determining application model subsets that contain a respective semantic construct;
   determining audiences associated with the application model subsets determined to contain the respective semantic construct;
   generating a topic for each of the audiences containing content related to a union of subsets associated with the audience; and
   merging topics containing identical content.

* * * * *